(12) United States Patent
Lin

(10) Patent No.: US 6,252,768 B1
(45) Date of Patent: Jun. 26, 2001

(54) SHOCK-ABSORBING DEVICE FOR NOTEBOOK COMPUTER MODULE

(75) Inventor: Chin-Chi Lin, I-Lan (TW)

(73) Assignee: Twinhead International Corp., Hsintien (TW)

( * ) Notice: Subject to any disclaimer, the term of this patent is extended or adjusted under 35 U.S.C. 154(b) by 0 days.

(21) Appl. No.: 09/376,540

(22) Filed: Aug. 18, 1999

(30) Foreign Application Priority Data

Jun. 9, 1999 (TW) .............................................. 88209440

(51) Int. Cl.[7] .............................. G06F 1/16; G06F 1/20; H05K 7/20; F16M 13/00
(52) U.S. Cl. ...................... 361/687; 361/685; 361/683; 361/719; 248/624; 248/625
(58) Field of Search ..................... 361/683, 686, 361/680, 685, 687, 704, 709, 717–719, 710, 715; 248/624, 625, 638, 694; 165/80.3; 257/726, 727; 267/150, 158, 160

(56) References Cited

U.S. PATENT DOCUMENTS

| | | | |
|---|---|---|---|
| 4,796,849 | * 1/1989 | Fouassier | 248/624 |
| 5,331,508 | * 7/1994 | Hosoi et al. | 361/680 |
| 5,590,024 | * 12/1996 | Honda et al. | 361/684 |
| 5,999,402 | * 12/1999 | Jeffries et al. | 361/687 |
| 6,061,240 | * 5/2000 | Butterbaugh et al. | 361/704 |

FOREIGN PATENT DOCUMENTS

0123456 A2 * 1/2000 (EP) .................................... 100/100

* cited by examiner

Primary Examiner—Leo P. Picard
Assistant Examiner—Lisa Lea-Edmonds
(74) Attorney, Agent, or Firm—Jiawei Huang; J.C. Patents

(57) ABSTRACT

A shock absorbing device for a notebook computer module. The device comprises of a notebook computer module, a cooling/protective plate, and two springs. A first spring is installed between the notebook computer module and the cooling/protective plate that provides a force trying to separate the cooling/protective plate and the module. The cooling/protective plate has a hole that permits a fastening insert to pass through. A first end of the fastening insert protrudes outside the cooling/protective plate while a second end of the fastening insert fastens onto the notebook computer module. There is a second spring between the first end of the fastening insert and the cooling/protective plate. The second spring provides a force trying to draw the cooling/protective plate closer to the module.

8 Claims, 5 Drawing Sheets

SHOCK-ABSORBING DEVICE FOR NOTEBOOK COMPUTER MODULE

BACKGROUND OF THE INVENTION

1. Field of Invention

The present invention relates to a shock-absorbing device. More particularly, the present invention relates to a shock-absorbing device for protecting a notebook computer module.

2. Description of Related Art

As the level of semiconductor integration continues to increase, size of various electronic devices inside a silicon chip becomes smaller. Therefore, the electronic devices need to be carefully protected from damage. In general, a component having a large number of devices is more vulnerable to physical damage than a component having few devices inside. Therefore, a compact component demands more protection.

Using the central processing unit (CPU) of a notebook computer as an example, the limited volume inside a notebook computer demands a CPU that is slightly different from a CPU installed inside a desktop computer. In addition, due to limited air space inside the notebook computer, airflow inside the notebook computer is also restricted. Therefore, heat dissipation is a problem for the CPU inside a notebook computer as well.

FIG. 1 is a schematic, cross-sectional view of a conventional shock-absorbing device around a notebook computer module. As shown in FIG. 1, a silicon chip 10 is mounted onto a printed circuit board (PCB) 12 via a connector (not shown). Alternatively, the silicon chip 10 is mounted directly onto the PCB 12. In general, a silicon chip installed inside a notebook computer has limited tolerance for temperature, pressure and bending. Because of the poor heat dissipating capability of the chip 10 alone and the vulnerability of the notebook computer to impact while being carried, a protective device is formed behind the printed circuit board 12 and above the chip 10.

Corresponding in position to chip 10, there is a backing plate 14 attached to the other side of the printed circuit board 12. Because the silicon chip 10 usually has a large number of pins that need to be connected to the printed circuit board 12, the printed circuit board 12 must have a certain degree of planarity to achieve connection. Since most printed circuit boards are not stiff enough, the supporting plate 14 serves as a stiff backing. In addition, the supporting plate 14 also provides some protection against bending to the PCB 12, because any bending is likely to damage the chip 10.

Due to the high level of integration on the silicon chip 10, the amount of heat generated during operation is enormous. Hence, there is a cooling/protective plate 16 on top of the silicon chip 10. The cooling/protective plate 16 is placed over the silicon chip 10 and fixed onto the printed circuit board 12 by a set of screws 18. A protruding element 19 above the chip 10 presses against a surface of the cooling/protective plate 16 so that heat generated by the chip 10 can be conducted away quickly. The cooling/protective plate 16 further has an elastic portion 15 that permits the absorption of shock from external impact. However, how to make the cooling/protective plate 16 contact the chip 10 so that heat can be dissipated without exerting too much pressure on the chip 10 itself is a major design consideration. In general, the cooling/protective plate 16 can only absorb forces in one direction. For example, the cooling/protective plate 16 can absorb a force coming from the top of the chip 10, but cannot withstand a force from the opposite direction. Therefore, the screws must be tightened very carefully so that the cooling/protective plate can exert a correct amount of pressure on the chip 10. The maximum pressure a silicon chip such as a micro-pin grid array ($\mu$PGA) can tolerate is only about 689 kpa. Due to unevenness of the chip's surface, stress on the silicon chip may exceed the 689 kpa limit in some local areas. Yet, if insufficient torque is applied to the screws 18, pressure exerted by the cooling/protective plate 16 on the protruding element 19 of the chip 10 is likely to be too low to provide a good contact for cooling. In addition, vibrations caused by physical impact of the notebook computer may loosen the grip of the cooling/protective plate. Even without any external impact, the pre-loaded pressure provided by the screws 18 just for holding the cooling/protective plate 16 onto the printed circuit board 12 is likely to bring down the shock buffering capacity of the cooling/protective plate 16.

SUMMARY OF THE INVENTION

Accordingly, the purpose of the present invention is to provide a shock-absorbing device for a notebook computer module. The module is capable of buffering the module against impact forces in both directions and providing a correct amount of contact pressure between the device and a cooling/protective plate.

To achieve these and other advantages and in accordance with the purpose of the invention, as embodied and broadly described herein, the invention provides a shock absorbing device. The device comprises a notebook computer module, a cooling/protective plate, and two springs. There is a first spring between the notebook computer module and the cooling/protective plate, and the notebook computer module and the cooling/protective plate are in contact with each other. The first spring provides a force that tries to separate the cooling/protective plate and the module. The first spring is slid over the body of a balancing rod. A first end of the balancing rod passes through a hole in the cooling/protective plate and a second end of the balancing rod touches the module. There is a fastening insert on the cooling/protective plate as well. The fastening insert passes through another hole in the cooling/protective plate and then fastens onto the module. A second spring is slid between one end of the fastening insert and the cooling/protective plate. The second spring provides a force that tries to bring the cooling/protective plate and a printed circuit board of the module. When the cooling/protective plate that holds the module is fastened onto a substratum, the amount of pressure on the module such as a chip can be adjusted by increasing or decreasing the spring loading. In the meantime, when an external force is exerted on the cooling/protective plate or the entire module is forced to vibrate, the stored potential in the springs can counteract a portion of the external force or vibrations. Hence, the force or the vibration is dampened and so the module inside the notebook computer is saved.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
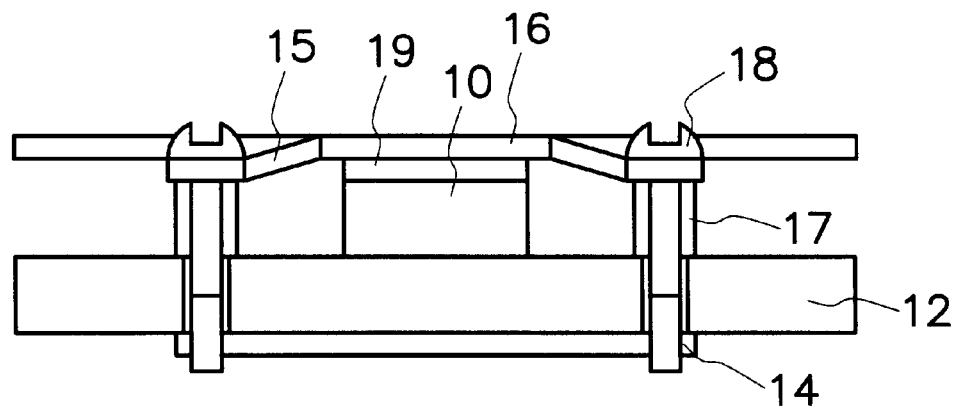
FIG. 1 is a schematic, cross-sectional view of a conventional shock-absorbing device round a notebook computer module.

Reference will now be made in detail to the present preferred embodiments of the invention, examples of which are illustrated in the accompanying drawings. Wherever possible, the same reference numbers are used in the drawings and the description to refer to the same or like parts.

Figure 2:
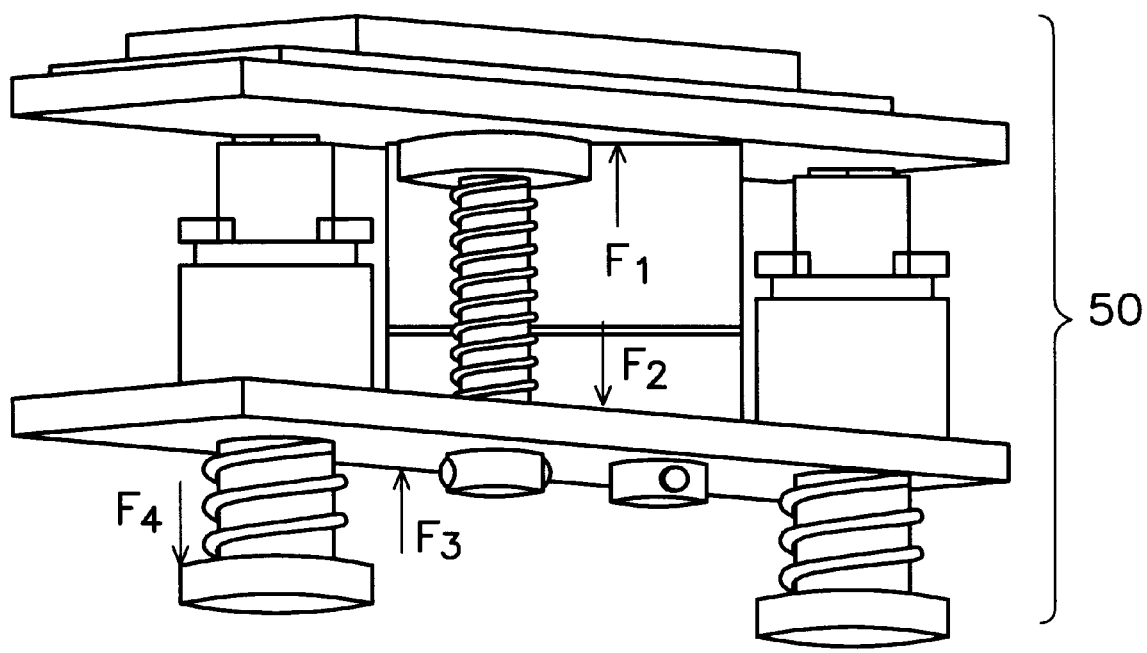
FIG. 2 is a perspective view of a shock-absorbing device for a notebook computer module according to a first embodiment of this invention.
Figure 3:
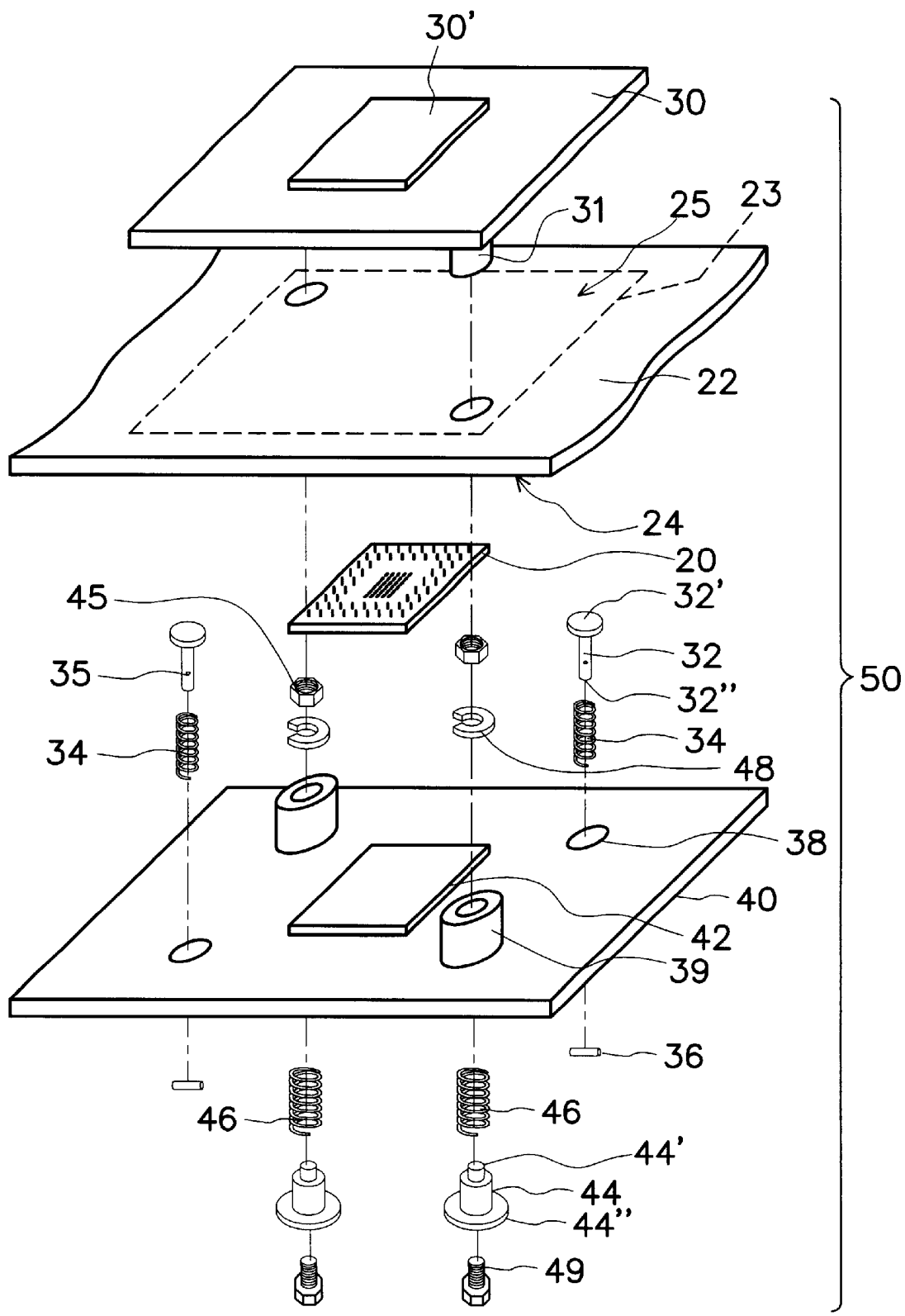
FIG. 3 is an exploded, perspective diagram showing all the components necessary for assembling the shock-absorbing device according to the first embodiment of this invention.

FIG. 2 is a schematic, perspective view of a shock-absorbing device for a notebook computer module according to a first embodiment of this invention. FIG. 3 is an exploded, perspective diagram showing all the components necessary for assembling the shock-absorbing: device according to the first embodiment of this invention. In general, the central processing unit (CPU) of a notebook computer requires greater protection. Therefore, the CPU inside a notebook computer must be surrounded by a good shock-absorbing device such as the one in FIG. 2. A micropin grid array type of microprocessor chip 20 is generally used inside a notebook computer. Due to the generation of a large amount of heat and the limited tolerance of any stress, the silicon chip 20 needs to be protected by a cooling/protective plate 40 and a backing plate 30.

As shown in FIG. 3, there is a chip-mounting region 23 on a printed circuit board 22 for mounting the chip 20. In fact, the chip 20 is mounted on a front surface 24 and the backing plate 30 is mounted on a back surface 25 of the chip-mounting region 23. The backing plate 30 is a flat and thin panel that can be mounted onto the printed circuit board 22 by glue or with screws. The surface area of the backing plate 30 is roughly the same as the chip-mounting region 23. In other words, the footprint of the backing plate 30 on the PCB 22 is larger than the footprint of the silicon chip 20 on the PCB 22. Since the silicon chip 20 is mounted onto the chip-mounting region 23, the backing plate 30 is able to provide a high degree of planarity for the chip on the printed circuit board 22. The backing plate 30 is also able to provide additional resistance against an external bending moment. Since the area on the printed circuit board 22 for mounting the chip 20 can still maintain a high degree of planarity despite bending, the chip 20 is protected. Furthermore, strength of the backing plate 30 can be further increased by adding one more backing plate 30' at the back of the backing plate 30.

The cooling/protective plate 40 is in contact with the silicon chip 20 so that heat generated by the chip can be carried away as quickly as possible. The surface area of the cooling/protective plate 40 is greater than that of the chip 20 but is almost identical to that of the chip-mounting region 23. Only the protruding element 42, which has a similar surface area as the silicon chip 20, is in direct contact with the chip 20. The cooling/protective plate 40 is fastened to the printed circuit board 22 by means of a screw 49 that passes through each of a pair of fastening inserts 44 on the cooling/protective plate 40. A pair of balancing rods 32 are positioned between the printed circuit board 22 and the cooling/protective plate 40. A fixed end 32' of each balancing rod 32 is in contact with the printed circuit board 22. The fixed end 32' of each balancing rod 32 is either pushed against the surface of the printed circuit board 22 or glued directly onto the surface of the printed circuit board 22. A movable end 32" of each balancing rod 32 passes through a hole 38 in the cooling/protective plate 40. There is a hole 35 near the movable end 32" of each balancing rod 32 for inserting a pin 36. The pin 36 is parallel to the cooling/protective plate 40 so that the positions of the balancing rods 32 are fixed. Furthermore, there is a compression spring 34 around each balancing rod 32. Since the balancing rods 32 are perpendicular to both the cooling/protective plate 40 and the printed circuit board 22, the balancing rod 32 can only move in an up or down direction, either compressing or relaxing the spring 34. Due to spring compression, a force of magnitude $F_1$ is exerted on the printed circuit board 22 and a force of magnitude $F_2$ is exerted on the cooling/protective plate 40. The forces $F_1$ and $F_2$ are of the same magnitude but act in opposite directions, and they try to separate the cooling/protective plate 40 and the printed circuit board 22. The furthest distance of separation between the cooling/protective plate 40 and the printed circuit board 22 is reached when the pins 36 touch the cooling/protective plate 40. When an external force acts on the cooling/protective plate 40 such that the cooling/protective plate 40 moves towards the printed circuit board 22, the silicon chip 20 is compressed. However, due to additional compression of the spring 34, forces $F_1$ and $F_2$ increasingly counteracts a portion of the external force so that the ultimate additional pressure on the chip 20 is greatly reduced.

A pair of fastening inserts 44 is also installed on the cooling/protective plate 40. A first end 44' of each fastening insert 44 passes through a protruding element 39 on the cooling/protective plate 40 and reaches the printed circuit board 22. A screw 49 that passes through the hollow center of the fastening insert 44, a C-clip 48 and a nut 45 finally sinks into a protruding element 31 on the backing plate 30. The backing plate 30, the printed circuit board 22 and the cooling/protective plate 40 are all parallel to each other but perpendicular to the fastening inserts 44. The nut 45 is used to support the protruding element 31 on the backing plate 30 so that the backing plate 30 is fastened onto the printed circuit board 22. The C-clip is one of the components in an assembly that also includes the fastening insert 44, a compression spring 46 and the screw 49.

A second end 44" of the fastening insert 44 has a large diameter than the body of the insert 44 so that the compression spring 46 can remain in position after sliding onto the fastening insert 44. The spring 46 is capable of providing a force $F_3$ to the cooling/protective plate 40 and a force $F_4$ to the fastening insert 44. Forces $F_3$ and $F_4$ are of the same magnitude but act in opposite directions. Forces $F_3$ and $F_4$ try to push the cooling/protective plate 40 away from the fastening insert 44. Since the fastening insert 44 is already fixed onto the printed circuit board 22, the cooling/protective plate 40 can chip 20.

Figure 4:
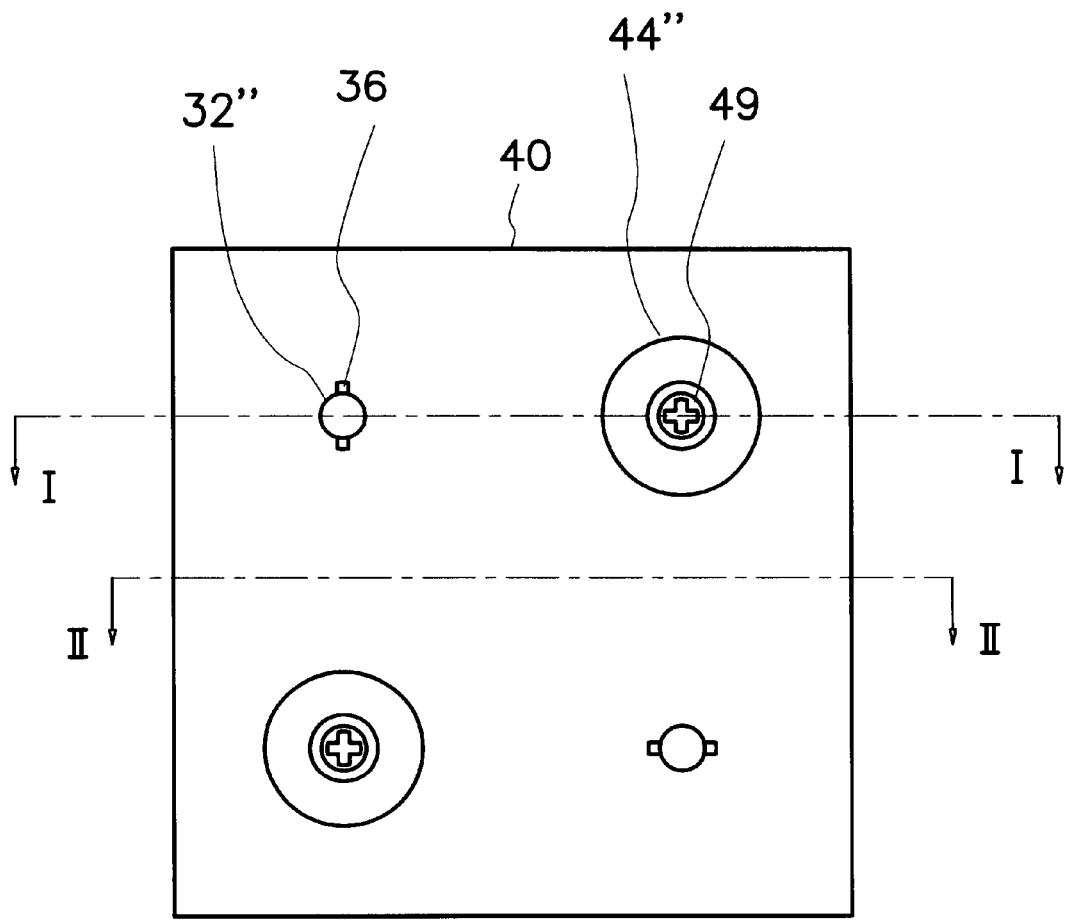
FIG. 4 is a schematic, bottom view of the shock-absorbing device according to the first embodiment of this invention.

FIG. 4 is a schematic, bottom view of the shock-absorbing device according to the first embodiment of this invention. As shown in FIG. 4 the cooling/protective plate 40 is in the shape of a square. The movable end 32" of the balancing rods 32 for carrying the spring 34 and the second end 44" of the fastening inserts 44 for carrying the spring 46 are arranged to be on opposite corners. Therefore, the force $F_2$ exerted by the spring 34 and the force $F_3$ exerted by the spring 46 on the cooling/protective plate 40 can balance. When an external force acts on the cooling/protective plate 40 pushing the cooling/protective plate 40 towards the chip 20 or away from the chip 20, the compression springs 34 or the compression springs 46 can provide a counteractive force. Hence, the chip 20 is protected. Obviously, the number of fastening inserts 44 and the number of balancing rods 32 can be variables as long as a stable configuration is possible.

Figure 5:
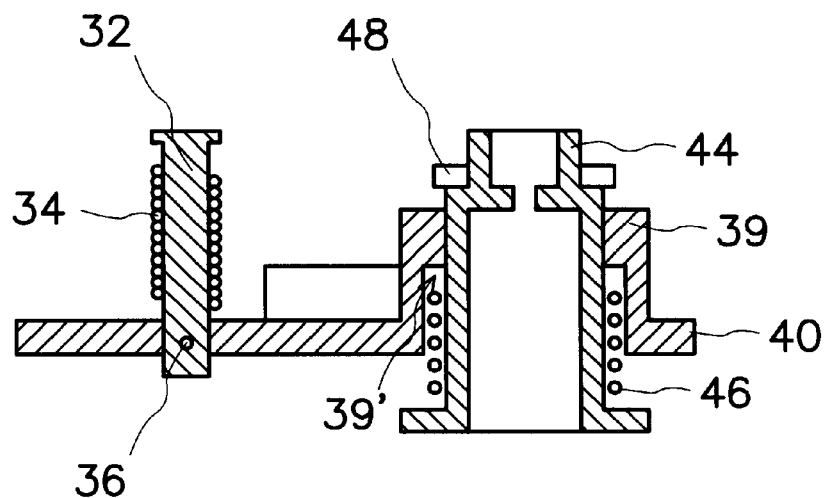
FIG. 5 is a schematic, cross-sectional view along line I—I of FIG. 4.
Figure 6:
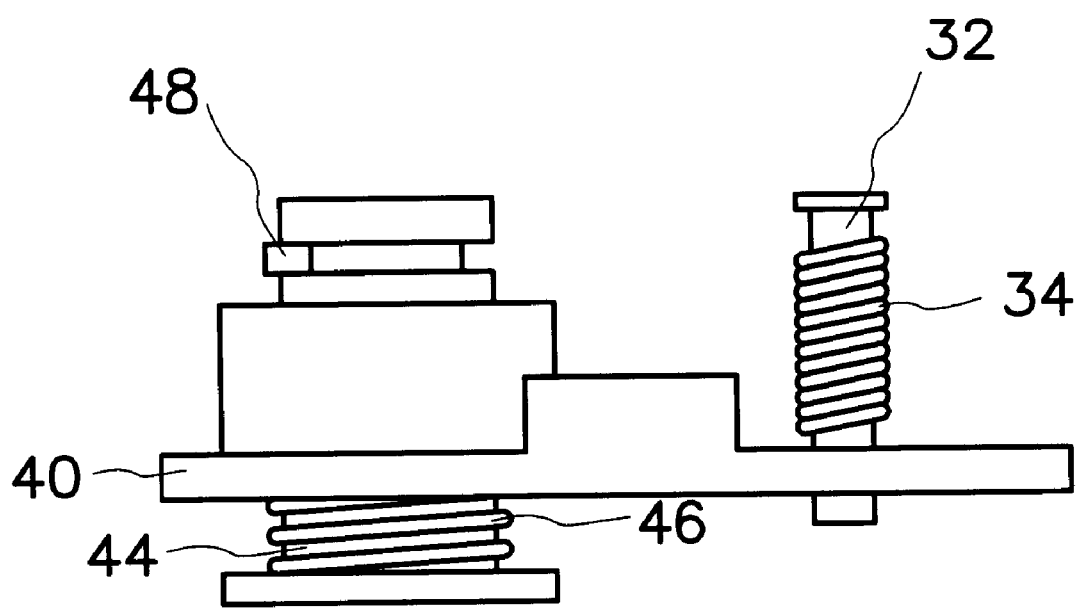
FIG. 6 is a schematic, cross-sectional view along line II—II of FIG. 4.

FIG. 5 is a schematic, cross-sectional view along line I—I of FIG. 4. FIG. 6 is a schematic, cross-sectional view along line II—II of FIG. 4. As shown in FIGS. 5 and 6, the protruding part 39 of the cooling/protective plate 40 actually has an internal cavity 39' having a diameter only slightly bigger than the compression spring 46. Consequently, when the spring 46 is pushed inside the internal cavity 39', the spring 46 does not move sideways and thus does not produce an unbalanced distribution of forces.

In this invention, forces exerted by the set of compression springs 46 and 34 on the cooling/protective plate 40 permit the cooling/protective plate 40 to contact the chip 20 without exerting too much pressure. In addition, the set of springs 46 and 34 each exerts a force on a corner of the chip-mounting region 23. Therefore, even a bending moment can be balanced. In other words, even if the edge of the cooling/protective plate 40 is under pressure, the springs 34 and 46 can still act concertedly to redistribute and counteract the external forces in order to protect the chip 20.

Figure 7:
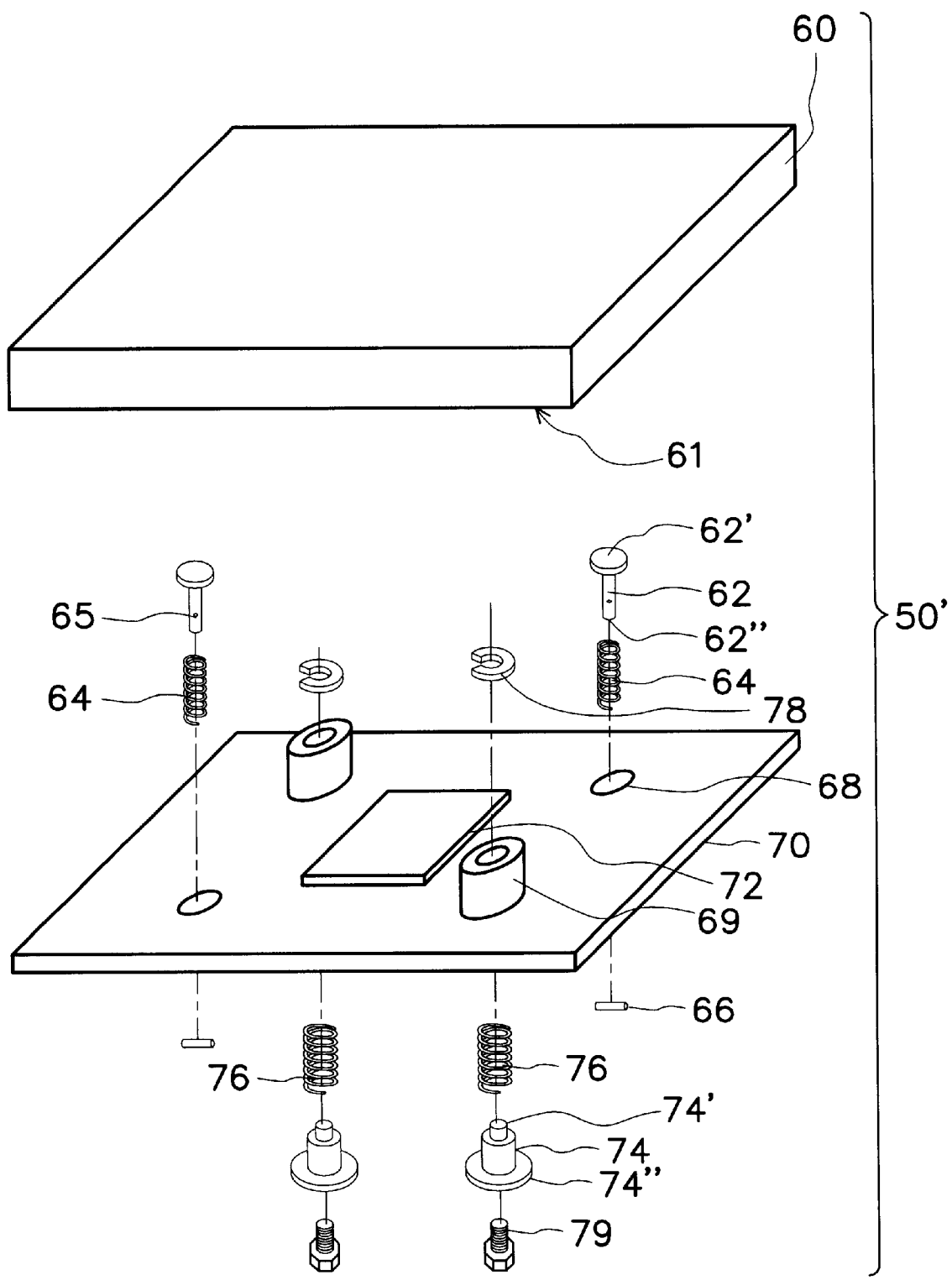
FIG. 7 is an exploded, perspective diagram showing all the components necessary for assembling a shock-absorbing device for a notebook computer module according to a second embodiment of this invention.

FIG. 7 is an exploded, perspective diagram showing all the components necessary for assembling a shock-absorbing device for a notebook computer module according to a second embodiment of this invention. As shown in FIG. 7, the shock-absorbing device is used to prevent the vibration of a hard disk 60 because the hard disk 60 is another easily damaged component inside a notebook computer. The hard disk 60 is mounted onto a support plate 70. Aside from supporting the hard disk 60, the support plate 70 also serves to protect the hard disk 60 against external impact. There is a pair of balancing rods 62 between a mounting surface 61 on the hard disk 60 and the support plate 70. A fixed end 62' of the balancing rod 62 directly contacts the mounting surface 61. The fixed end 62' is glued onto the mounting surface 61 or is simply pushed against the mounting surface 61. A movable end 62" of the balancing rod 62 passes through a hole 68 on the support plate 70. There is a hole 65 near the movable end 62" of the balancing rod 62 such that a pin 66 can be inserted after the movable end of the rod passes through the support plate 70. The inserted pin 66 is parallel to the mounting surface 61 so that there is a maximum travel distance for the balancing rod 62 with respect to the support plate 70. A compression spring 64 is slid over each balancing rod 62. Since the balancing rod 62 is perpendicular to the support plate 70, the compression spring 64 can only move up and down relative to the support plate 70. Due to the compression of the springs 64, a force of the same magnitude but opposite in direction acts on the mounting surface 61 and the support plate 70, respectively. The forces try to separate the mounting surface 61 from the support plate 70.

A pair of hollow-center fastening inserts 74 is also installed on the support plate 70. A first end 74' of the fastening insert 74 passes through a protruding element 69 on the support plate 70 and contacts the mounting surface 61. A screw 79 that passes through the fastening insert 74, a C-clip 78 and the mounting surface, and sinks into the hard disk 60. Hence, the fastening inserts 74 are fixed onto the mounting surface 61. A second end 74" of the fastening insert 74 has a larger diameter so that a compression spring 76 slid onto the fastening insert 74 can remain in position. Due to the compression of the springs 76, a force of the same magnitude but opposite in direction acts on the second end 74" of the fastening inserts 74 and the support plate 70, respectively. The forces try to draw the support plate 70 closer to the mounting surface 61.

The second embodiment of this invention is very similar to the first embodiment. Both embodiments make use of two sets of compression springs to provide forces acting from different positions. Hence, a notebook computer module surrounding by the shock-absorbing device is buffered against external forces caused by unwanted impact.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A shock-absorbing device for a notebook computer module, comprising of:

a silicon chip;

a printed circuit board having a chip-mounting region, wherein the chip-mounting region has a front face and a back face, and the silicon chip is mounted onto the front face of the chip-mounting region;

a backing plate mounted onto the back face of the printed circuit board within the chip-mounting region;

a cooling/protective plate mounted onto the front face of the chip-mounting region such that the cooling/protective plate not only covers the silicon chip but also contacts the silicon chip;

a first spring installed between the printed circuit board and the cooling/protective plate with one end of the spring touching the printed circuit board and the other end of the spring touching the cooling/protective plate, the first spring exerting a first reaction force is on the printed circuit board and a second reaction force on the cooling/support plate, and both the first reaction force and the second reaction force are of the same magnitude but act in opposite directions in trying to move the printed circuit board away from the cooling/support plate;

a fastening insert that passes through the cooling/protective plate, the fastening insert having a first end and a second end, the second end contacting the front face of the printed circuit board, and the cooling/protective plate being somewhere between the first and the second end of the fastening insert; and a second spring slid over the fastening insert such that one end of the second spring pushes against a flange at the first end of the fastening insert and the other end of the second spring pushes against the cooling/protective plate, the second spring exerting a third reactive force on the cooling/protective plate and a fourth reactive force on the first end of the fastening insert, and both the third reaction force and the fourth reaction force being of the same magnitude but act in opposite directions in trying to move the cooling/support plate closer to the printed circuit board;

wherein the first spring and the second spring are alternatingly placed around the peripheral regions of the cooling/protective plate.

2. The device of claim 1, wherein the first spring and the second spring are compression springs.

3. The device of claim 2, wherein the device further includes a balancing rod installed between the printed circuit board and the cooling/protective plate such that the first spring can slide over the balancing rod, the balancing rod having:

a fixed end that touches the printed circuit board; and a movable end that passes through of the cooling/protective plate, the movable end having a hole for inserting a pin so that the balancing rod is bounded by the cooling/protective plate, and the balancing rod can only moving in a direction perpendicular to the cooling/protective plate.

4. The device of claim 2, wherein the second end of the fastening insert is fastened to the printed circuit board by means of a screw.

5. A shock-absorbing device for a notebook computer, comprising of:

a notebook computer module having a mounting surface;

a support plate that contacts the mounting surface and supports the notebook computer module;

a first spring installed between the notebook computer module and the support plate such that one end of the spring touches the module and the other end of the spring touches the support plate, the first spring exerting a first reactive force on the notebook computer module and a second reactive force on the support plate, and both the first reaction force and the second reaction force being of the same magnitude but acting in opposite directions in trying to move the notebook computer module away from the support plate;

a fastening insert that passes through the support plate, the fastening insert has a first end and a second end, the second end being fastened onto the notebook computer module, and the support plate being somewhere between the first and the second end of the fastening insert; and a second spring slid over the fastening insert such that one end of the second spring pushes against a flange at the first end of the fastening insert and the other end of the second spring pushes against the support plate, the second spring exerting a third reactive force on the support plate and a fourth reactive force on the first end of the fastening insert, and both the third reaction force and the fourth reaction force being of the same magnitude but act in opposite directions in trying to move the support plate closer to the notebook computer module;

wherein the first spring and the second spring are alternatingly placed around the peripheral regions of the support plate.

6. The device of claim 5, wherein the notebook computer module is a hard disk.

7. The device of claim 5, wherein the first spring and the second spring are compression springs.

8. The device of claim 5, wherein the device further includes a balancing rod installed between the notebook computer module and the support plate such that the first spring can slide over the balancing rod, the device having:

a fixed end that touches the notebook computer module; and a movable end that passes through of the support plate, the movable end having a hole for inserting a pin so that the balancing rod is bounded by the support plate, and the balancing rod can only move in a direction perpendicular to the support plate.

* * * * *